(12) United States Patent
Matsumoto

(10) Patent No.: US 10,847,980 B2
(45) Date of Patent: Nov. 24, 2020

(54) BATTERY MODULE

(71) Applicant: Toyota Jidosha Kabushiki Kaisha, Toyota-shi, Aichi-ken (JP)

(72) Inventor: Mizuho Matsumoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 50 days.

(21) Appl. No.: 16/209,348

(22) Filed: Dec. 4, 2018

(65) Prior Publication Data

US 2019/0173293 A1 Jun. 6, 2019

(30) Foreign Application Priority Data

Dec. 5, 2017 (JP) ................................. 2017-233845

(51) Int. Cl.
*H02J 7/00* (2006.01)
*H01M 10/48* (2006.01)
*H01M 10/44* (2006.01)
*H01M 2/04* (2006.01)

(52) U.S. Cl.
CPC ....... *H02J 7/00041* (2020.01); *H01M 2/0456* (2013.01); *H01M 10/443* (2013.01); *H01M 10/486* (2013.01); *H02J 7/0091* (2013.01); *H01M 2/0473* (2013.01)

(58) Field of Classification Search
CPC ........ H01M 2/04; H01M 2/0456; G01K 1/00; G01K 1/14
See application file for complete search history.

(56) References Cited

U.S. PATENT DOCUMENTS

| | | | |
|---|---|---|---|
| 2007/0223560 A1* | 9/2007 | Boese | ........................ C23C 4/18 374/141 |
| 2017/0023415 A1* | 1/2017 | Decker | ................... G01K 1/143 |
| 2017/0199084 A1* | 7/2017 | Kimura | ................... G01R 31/36 |

FOREIGN PATENT DOCUMENTS

| | | |
|---|---|---|
| JP | 2015099087 A | 5/2015 |
| JP | 2016018740 A | 2/2016 |

* cited by examiner

*Primary Examiner* — Matthew J Merkling
(74) *Attorney, Agent, or Firm* — Dinsmore & Shohl LLP

(57) ABSTRACT

A battery module includes a secondary battery, temperature detection unit that detects temperature information about the secondary battery, and a control device that controls charging and discharging of the secondary battery on the basis of the temperature information detected by the temperature detection unit. In the battery module, a level difference (recess) is provided on the surface of at least one of the secondary battery and the temperature sensor such that a space is formed at least at a central portion of a contact region at which the temperature sensor of the temperature detection unit and the secondary battery come into contact with each other. As a result, a space in which foreign matter can be accommodated can be formed, and accordingly the temperature information about the secondary battery can be detected with high precision by suitably bringing the temperature sensor and the secondary battery into contact with each other.

20 Claims, 12 Drawing Sheets

BATTERY MODULE

CROSS-REFERENCE TO RELATED APPLICATIONS

This application claims priority based to Japanese Patent Application No. 2017-233845 filed on Dec. 5, 2017, the entire contents of which are incorporated herein by reference.

BACKGROUND

1. Technical Field

The present disclosure relates to a battery module. More particularly, the present disclosure relates to a battery module provided with a secondary battery, and with a control device that controls charging and discharging of the secondary battery.

2. Description of the Related Art

In recent years, secondary batteries such as lithium ion secondary batteries and nickel-hydride batteries have been suitably used as portable power sources in mobile terminals and the like, and as power sources for vehicle drive. In particular, lithium ion secondary batteries, which are lightweight and afford high energy density, have been gaining in importance as high-output power sources that are utilized in vehicles such as electric cars and hybrid automobiles. These secondary batteries are mounted in vehicles or the like in the state of battery modules provided with one or more secondary batteries, and with a control device that controls charging and discharging of the secondary batteries.

Generally, temperature detection unit equipped with a temperature sensor is provided in such battery modules. The temperature sensor is attached to a secondary battery, and the temperature detection unit detects temperature information about the secondary battery on the basis of a signal transmitted from the temperature sensor. Such temperature information is transmitted to the control device and is used for controlling charging and discharging of the secondary battery.

If the attachment position of the temperature sensor in the battery module becomes offset, temperature information about the secondary battery can no longer be detected correctly, and problems may arise in the control of charging and discharging.

With the above problem as a backdrop, Japanese Patent Application Publication No. 2016-18740 discloses a structure for checking the attachment state of a thermistor (temperature sensor). Specifically, the battery module of the document is provided with a check hole for checking the attachment state of a thermistor, in a cover with which a battery cell (secondary battery) is covered. Further, Japanese Patent Application Publication No. 2015-99087 discloses the feature of determining the contact state of a thermistor (temperature sensor) on the basis of a measurement result of electric resistance.

SUMMARY

Upon actual production of a battery module, however, a problem arose in some instances in that the detection precision of temperature information dropped, and charging and discharging could not be controlled properly by the control device, despite the fact that a temperature sensor was attached at an appropriate position in accordance with the feature described above. A battery module exhibiting such a drop in detection precision is scrapped as defective (or is reused), which significantly detracts from manufacturing efficiency.

It is a main object of the present disclosure, arrived at in the light of the above considerations, to provide a battery module in which temperature information about a secondary battery can be detected with high precision, and charging and discharging can be controlled properly on the basis of the temperature information.

To achieve the goal, the present disclosure provides a battery module having the configuration below.

The battery module disclosed herein is provided with: at least one secondary battery; temperature detection unit that detects temperature information about the secondary battery; and a control device that controls charging and discharging of the secondary battery on the basis of the temperature information detected by the temperature detection unit, wherein the temperature detection unit is provided with a temperature sensor that comes into contact with the secondary battery.

In the battery module disclosed herein, a level difference is provided at a surface of at least one of the secondary battery and the temperature sensor, in such a manner that a space is formed at least at a central portion of a contact region at which the secondary battery and the temperature sensor come into contact with each other.

In order to achieve the above goal, the inventors studied the cause for the drop in detection precision of temperature information about the secondary battery, even when a temperature sensor is attached at an appropriate position. As a result, the inventors found that foreign matter such as metal chips (sputter) generated by laser welding for sealing a battery case may in some instances become trapped between the temperature sensor and the secondary battery, and this trapped foreign matter may give rise to a drop in the detection precision of temperature information. In particular, as illustrated in FIG. 9, a secondary battery 110 and a temperature sensor 122 cannot be brought directly into contact with each other when foreign matter F becomes trapped at a central portion of a region (hereafter also referred to as "contact region A") at which the secondary battery 110 and the temperature sensor 122 are in contact. The detection precision of temperature information drops significantly as a result, and control of charging and discharging by the control device is likelier to become difficult.

In the light of the above findings, a goal of the battery module disclosed herein is to prevent the detection precision of temperature information from dropping to an extent where control of charging and discharging becomes difficult, also in case of adhesion of foreign matter such as sputter. In the battery module disclosed herein, specifically, a level difference is provided at the surface of at least one of the secondary battery and the temperature sensor, in such a manner that a space is formed at least at a central portion of a contact region at which the secondary battery and the temperature sensor come into contact with each other. As a result, foreign matter can be accommodated in the interior of the space formed at the central portion, even when foreign matter becomes adhered at the central portion of the contact region, and accordingly it becomes possible to prevent foreign matter from hindering contact of the secondary battery and the temperature sensor. The temperature information the secondary battery can therefore be detected with high precision by properly bringing the temperature sensor and the secondary battery into contact with each other.

In some embodiments, a recess is formed on the surface of at least one of the secondary battery and the temperature sensor, and the space is formed at a position of the recess at which the secondary battery and the temperature sensor are brought into contact with each other.

Examples for forming, in the contact region, a space in which foreign matter can be accommodated include for instance forming a recess at the surface of the secondary battery and/or the surface of the temperature sensor, as described above. Such a recess can be formed easily for instance by pressing, in which case costs can be accordingly reduced.

The recess may be formed on the surface of at least one of the secondary battery and the temperature sensor, but in some embodiments, the recess is formed only on the secondary battery side, since the detection precision of temperature information may drop somewhat when the recess is formed on the temperature sensor side.

In some embodiments, a surface area of the recess in a plan view is 1% to 5% of a surface area of the contact region.

Detection precision of temperature information may drop if the surface area of the recess is excessively large with respect to the surface area of the contact region of the temperature sensor and the secondary battery. On the other hand, formation of a space capable of accommodating foreign matter becomes difficult when the surface area of the recess is too small. In some embodiments, the surface area of the recess in a plan view is set to lie in the above-described range, taking into consideration the surface area of the contact region.

In some embodiments, the recess in the plan view has a circular shape, and the circular recess has a diameter of 0.5 mm to 2 mm.

As described above, detection precision of temperature information may drop when the surface area of the recess is excessively large, while a space capable of accommodating the foreign matter may be difficult to form when the surface area surface area of the recess is excessively small. In some embodiments, the dimension of foreign matter generated for instance during welding of an ordinary battery case is about 0.3 mm, and accordingly there is formed a circular recess having a diameter of 0.5 mm or larger, to form a space in which foreign matter can be accommodated properly. In some embodiments, the diameter of the circular recess is set to be 2 mm or smaller, in order to prevent drops in detection precision of temperature information caused by a small contact area of the secondary battery and the temperature sensor.

In some embodiments, the recess in the plan view has a square shape, and sides of the square recess each have a length of 0.5 mm to 2 mm.

The shape of the recess in a plan view is not limited to being the above-described circular shape, and various shapes can be adopted herein; for instance, a recess having a square shape in a plan view can be formed. In some embodiments, where the square recess is formed, the length of the sides of the square recess is set to lie in the range of 0.5 mm to 2 mm. As a result, it becomes possible to form a space in which foreign matter can be accommodated properly, without incurring significant impairment of detection precision of temperature information.

In some embodiments, the recess has a depth of 0.3 mm to 1.0 mm.

In some embodiments, the depth of the recess is set to be 0.3 mm or greater, to form a space in which foreign matter of about 0.3 mm, generated for instance by laser welding, can be accommodated properly. If the recess is too deep, however, the strength of the secondary battery might drop, and accordingly, in some embodiments, the depth of the recess is 1 mm or less.

In some embodiments, a protrusion is formed on the surface of at least one of the secondary battery and the temperature sensor, and a space surrounded by the protrusion is formed when the secondary battery and the temperature sensor are brought into contact with each other.

The level difference for forming a space at the contact region of the secondary battery and the temperature sensor is not limited to the recess described above, and may be a protrusion. In that case as well, a space surrounded by the protrusion is formed between the secondary battery and the temperature sensor, such that foreign matter can be accommodated in the space.

In some embodiments, the protrusion may be formed on the surface of at least one of the secondary battery and the temperature sensor, but in some embodiments the protrusion is formed only on the secondary battery side. In this case, the contact region of the secondary battery and the temperature sensor stands higher than the surface of the secondary battery. As a result, it becomes possible to suppress drops in the detection precision of temperature information caused by intrusion, between the secondary battery and the temperature sensor, of water droplets when these become adhered to the outer surface of the secondary battery.

In some embodiments, the protrusion has a height of 0.2 mm to 1.0 mm.

In some embodiments, a protrusion having a height of 0.2 mm or greater is formed herein with a view to forming a space in which foreign matter of about 0.3 mm, generated for instance by laser welding, can be accommodated properly. Formation of a protrusion of sufficient height allows suitably suppressing intrusion of water droplets between the secondary battery and the temperature sensor. When the height of the protrusion excessive, on the other hand, the strength of the protrusion decreases; accordingly, in some embodiments, the height of the protrusion is set to be 1 mm or smaller.

DETAILED DESCRIPTION OF THE EMBODIMENTS

Figure 1:
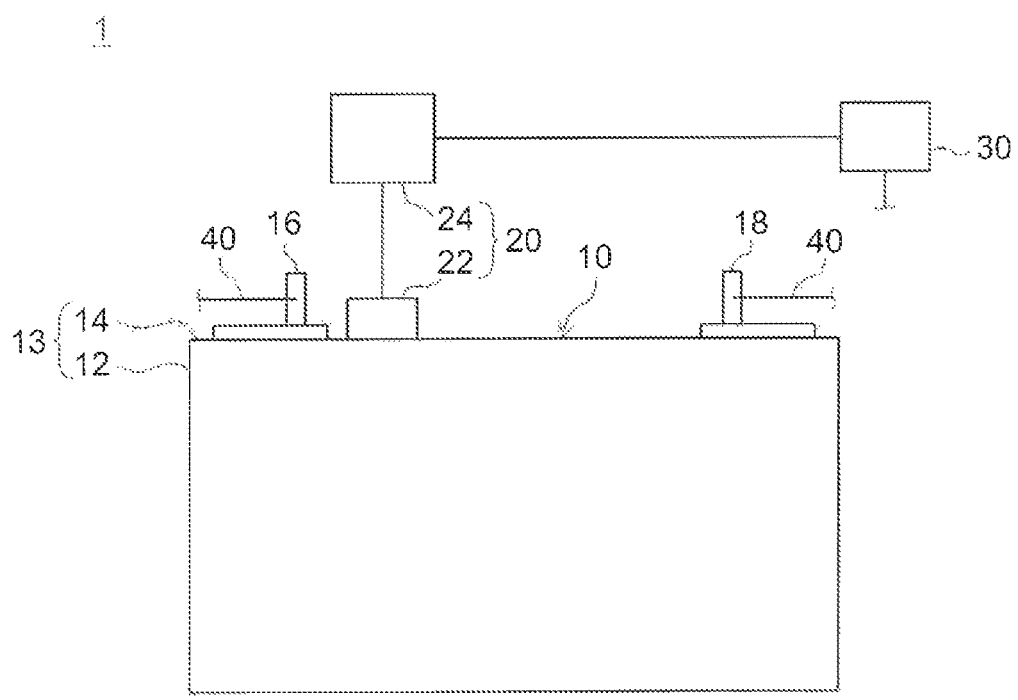
FIG. 1 is a diagram illustrating schematically a battery module according to a first embodiment of the present disclosure.

Embodiments of the battery module disclosed herein Will be explained next. In the explanation below, members and portions in the drawings that elicit identical effects are denoted with identical reference symbols. The dimensional relationships (length, width, thickness and so forth) in the figures do not necessarily reflect actual dimensional relationships. Any features other than the matter specifically set forth in the present specification and that may be necessary for carrying out the present disclosure (for instance, the configuration and production method of an electrode body and of an electrolyte solution) can be regarded as instances of design matter for a person skilled in the art based on known art in the relevant technical field.

1. First Embodiment

Figure 2:
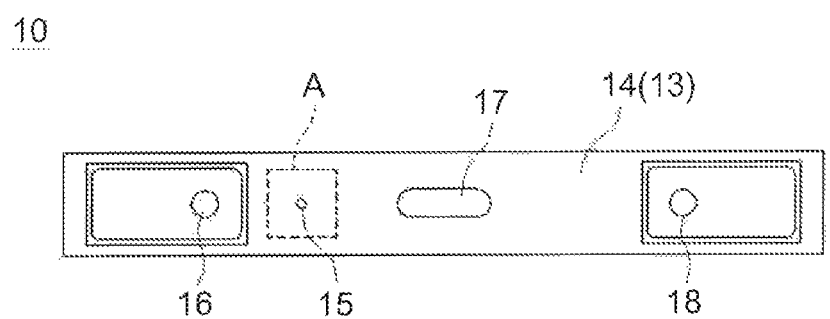
FIG. 2 is a plan-view diagram of a secondary battery that is used in the battery module illustrated in FIG. 1.

FIG. 1 is a diagram illustrating schematically a battery module according to a first embodiment. FIG. 2 is a plan-view diagram of a secondary battery that is used in the battery module illustrated in FIG. 1.

As illustrated in FIG. 1, the battery module 1 according to the present embodiment comprises a secondary battery 10, temperature detection unit 20 and a control device 30. Various features of the battery module 1 will be explained next.

(1) Secondary Battery

As illustrated in FIG. 1, the battery module 1 according to the present embodiment is provided with one secondary battery 10. In the present embodiment, a lithium ion secondary battery is used as the secondary battery 10. Lithium ion secondary batteries are secondary batteries that utilize lithium ions as a charge carrier, and that are charged and discharged through movement of charge with the lithium ions. The term "secondary battery" in the present specification denotes batteries in general that can be charged repeatedly, and encompasses, other than lithium ion secondary batteries, also so-called storage batteries such as nickel-hydride batteries.

The secondary battery 10 of the present embodiment is provided with a battery case 13 made up of a flat square case body 12 open at the top face, and with a lid body 14 that plugs the top face of the case body 12. The battery case 13 is sealed through joining of the case body 12 and the lid body 14 for instance by laser welding.

Although not illustrated in the figures, an electrode body being a power generation element is accommodated in the interior of the battery case 13. The electrode body is provided with a sheet-shaped positive electrode and with a sheet-shaped negative electrode. A nonaqueous electrolyte solution is filled between the positive electrode and the negative electrode of the electrode body. Charging and discharge take place on account of movement of lithium ions between the positive electrode and the negative electrode via the nonaqueous electrolyte solution.

A pair of electrode terminals 16, 18 is provided in the lid body 14 of the secondary battery 10. One end of each electrode terminal 16, 18 is connected to the electrode body inside the battery case 13, while the other end is exposed outside the battery case 13. The electrode terminals 16, 18 exposed outside the battery case 13 are connected to an external device (not shown), such as a motor of a vehicle, via bus bars 40 being connection members. As illustrated in FIG. 2, a gas discharge valve 17 for discharge of gas from the interior of the battery case 13, when the pressure inside the battery case 13 rises abnormally, is formed in the lid body 14 of the secondary battery 10 of the present embodiment.

Materials utilized in ordinary lithium ion secondary batteries can be used, without particular limitations, as the materials of the members that make up the secondary battery 10, and are not characterizing features of the present disclosure. Accordingly, a concrete explanation of such materials will be omitted herein.

(2) Temperature Detection Unit

As, illustrated in FIG. 1, the battery module 1 according to the present embodiment is provided with the temperature detection unit 20 that detects temperature information about the secondary battery 10. The temperature detection unit 20 is provided with a temperature sensor 22 attached to the secondary battery 10 (lid body 14 of the battery case 13), and with a computing device 24 connected to the temperature sensor 22. The temperature sensor 22 is a square-type sensor having built therein a temperature detection element (for instance a thermistor) the electric resistance of which changes significantly accompanying changes in the temperature of the secondary battery 10. The temperature detection unit 20 in the present embodiment transmits changes in electric resistance occurring in the temperature sensor 22 to the computing device 24, and calculates temperature information about the secondary battery 10, in the computing device 24, on the basis of those changes in electric resistance. The length of one side of the square-type temperature sensor 22 used in the present embodiment is 5 mm to 20 mm (for instance about 10 mm).

In the battery module 1 according to the present embodiment, a space S (see FIG. 4A) such that a central portion of a region of the temperature sensor 22 and the secondary battery 10 is encompassed by the space S (contact region A in FIG. 2), is formed between the temperature sensor 22 and the secondary battery 10. The structure of the contact region A having the space S formed therein will be explained in detail further on; herein, formation of the space S allows preventing foreign matter from hindering contact between the temperature sensor 22 and the secondary battery 10, and allows suppressing drops in the detection precision of temperature information.

(3) Control Device

The control device 30 controls charging and discharging of the secondary battery 10 on the basis of the temperature information detected by the temperature detection unit 20. The control device 30 is provided with a computing processing unit that performs calculations in accordance with a program established beforehand, and with a storage unit that stores digitized information. The computing unit may also be referred to for instance as central processing unit (CPU). The storage unit may also be referred to as memory, hard disk or the like. The control device 30 performs predetermined computing processing in accordance with a program established beforehand, and electrically controls charging and discharging of the secondary battery 10 on the basis of the calculation result.

The temperature information about the secondary battery 10, detected by the temperature detection unit 20, is taken into consideration in the calculation for controlling charging and discharging of the secondary battery 10 in the battery module 1 according to the present embodiment.

In a case where the battery module 1 according to the present embodiment is mounted in a vehicle, the control device 30 may be built into an electronic control unit (engine control unit (ECU)) that is mounted in a vehicle in order to control the engine, the steering wheel, the brakes, the secondary battery and so forth.

(4) Structure of the Contact Region

In the battery module 1 according to the present embodiment, as pointed out above, a space S is formed such that the central portion of the contact region A at which the secondary battery 10 and the temperature sensor 22 come into contact with other. The structure of the contact region A having the space S formed therein will be explained next.

Figure 3A:
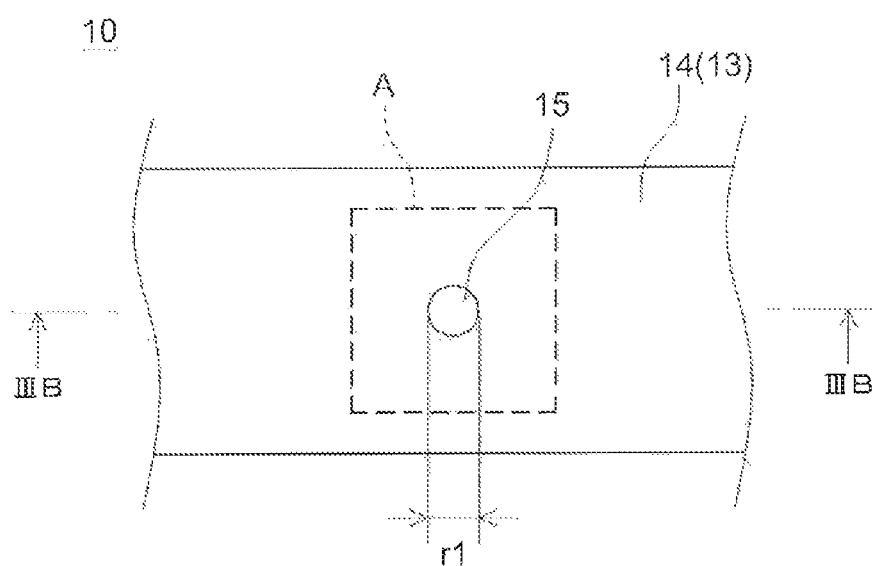
FIG. 3A is a plan-view diagram of an enlargement of the vicinity of a contact region of the secondary battery illustrated in FIG. 2.
Figure 3B:
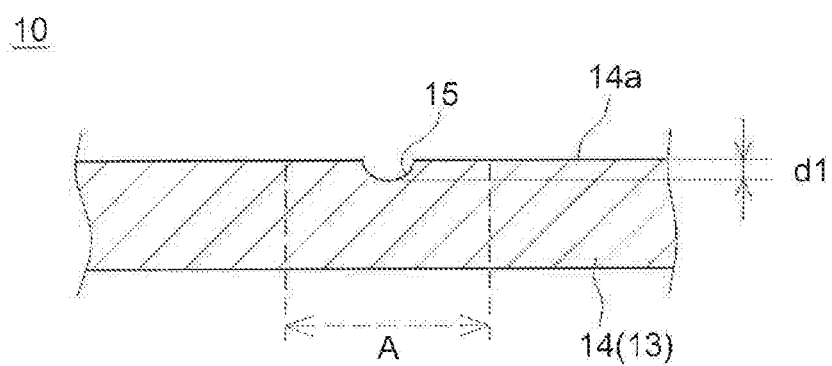
FIG. 3B is a IIIB-IIIB cross-sectional diagram of FIG. 3A.
Figure 4A:
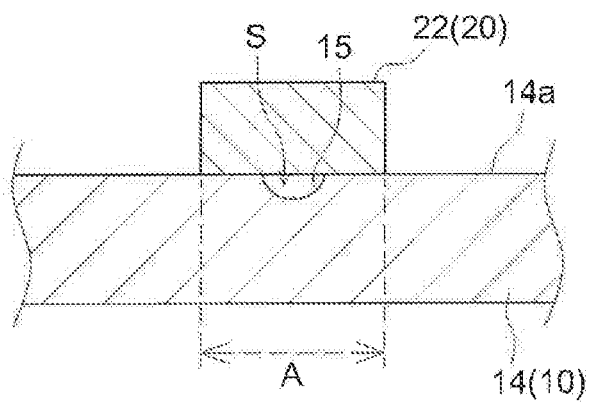
FIG. 4A is a diagram illustrating schematically the cross-sectional structure of the vicinity of a contact region of a secondary battery and a temperature sensor in a battery module according to a first embodiment of the present disclosure.
Figure 4B:
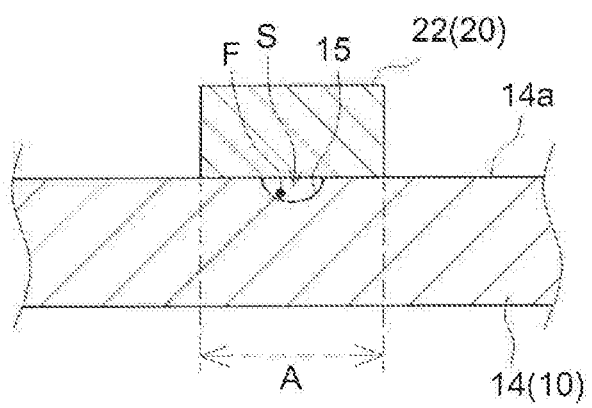
FIG. 4B is a diagram illustrating schematically the cross-sectional structure of the vicinity of a contact region of a secondary battery and a temperature sensor in a battery module according to a first embodiment of the present disclosure.
Figure 4C:
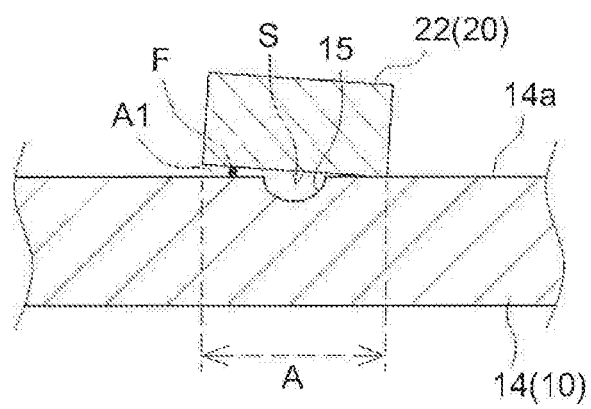
FIG. 4C is a diagram illustrating schematically the cross-sectional structure of the vicinity of a contact region of a secondary battery and a temperature sensor in a battery module according to a first embodiment of the present disclosure.

FIG. 3A is a plan-view diagram of an enlargement of the vicinity of the contact region of the secondary battery illustrated in FIG. 2, and FIG. 3B is a IIIB-IIIB cross-sectional diagram of FIG. 3A. FIG. 4A to FIG. 4C are diagrams illustrating schematically the cross-sectional structure of the vicinity of the contact region of the secondary battery and the temperature sensor in the battery module according to the first embodiment.

As illustrated in FIG. 3A and FIG. 3B, a flat circular recess 15 is formed in a top face 14a of the lid body 14 of the secondary battery 10, in such a manner that the recess 15 encompasses the central portion of the contact region A. The formation of the recess 15 is not particularly limited, and for instance pressing or cutting can be resorted to herein. In some embodiments, pressing can be resorted to from the viewpoint of processing cost and precision. In particular, the lid body of an ordinary secondary battery is formed through pressing, and accordingly the recess 15 can be formed easily by providing a projection, corresponding to the recess, in the die that is used for pressing, without newly providing a working step for forming the recess 15.

The surface area of the recess 15 in a plan view is adjusted as appropriate depending on the size of foreign matter generated for instance on account of laser welding, and depending on the surface area of the contact region A. Specifically, when the surface area of the recess 15 in a plan view is too small, it is difficult to from a space in which foreign matter can be accommodated properly. When on the other hand the surface area of the recess 15 with respect to the surface area of the contact region A is excessively large, the-detection precision of temperature information may drop somewhat, since the contact area of the secondary battery 10 and the temperature sensor 22 is smaller in that case. With the above in mind, the surface area of the recess 15 in a plan view is 1% to 5% (for instance 3%) of the surface area of the contact region A.

More specifically, the dimension of the foreign matter generated for instance by laser welding is about 0.3 mm; in a case where the surface area of the contact region A is 100 mm$^2$, the diameter r1 of a circular recess 15 is set within a range of 0.5 mm to 2 mm, for instance to 2 mm. As a result, it becomes possible to form a space capable of accommodating foreign matter properly, between the secondary battery 10 and the temperature sensor 22, and to sufficiently secure the surface area of the contact region A.

The depth d1 of the recess 15 illustrated in FIG. 3B is for instance 0.3 mm to 1.0 mm (for instance 0.5 mm). The depth of the recess 15 is set to 0.3 mm or more, to form a space within which foreign matter of about 0.3 mm, such as the above-described one, is accommodated properly. If the recess 15 is too deep, the strength of the secondary battery 10 (lid body 14) may decrease; accordingly, the depth of the recess is set to 1 mm or less.

In the battery module 1 according to the present embodiment, the temperature sensor 22 is attached to the top face 14a of the lid body 14 of the secondary battery 10 in such a manner that the recess 15 is disposed at the central portion of the contact region A, as illustrated in FIG. 4A. As a result, the space S surrounded by the temperature sensor 22 and the lid body 14 is formed at the position of the recess 15 of the lid body 14.

In the battery module 1 in which the space S is thus formed at the contact region A of the temperature sensor 22 and the lid body 14, foreign matter F generated in the production process can be accommodated in the interior of the space S, as illustrated in FIG. 4B, even when the foreign matter F becomes adhered on the central portion of the contact region A. As a result, it becomes possible to prevent the foreign matter F from hindering contact of the secondary battery 10 and the temperature sensor 22.

In the battery module 1 according to the present embodiment, foreign matter F may become trapped between the secondary battery 10 and the temperature sensor 22, without being accommodated in the space S, in a case where the foreign matter F becomes adheres to a peripheral edge portion A1 of the contact region A, as illustrated in FIG. 4C. In such a case the contact area of the secondary battery 10 and the temperature sensor 22 decreases as compared with the instance where the foreign matter F is accommodated in the space S (see FIG. 4B), and accordingly the detection precision of temperature information may drop somewhat.

Figure 9:
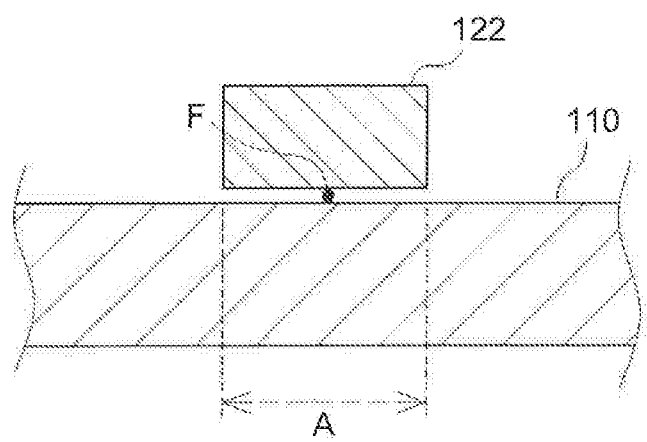
FIG. 9 is a diagram illustrating schematically the cross-sectional structure of the vicinity of a contact region of a secondary battery and a temperature sensor in a conventional battery module.

Even in the state illustrated in FIG. 4C, however, there can be secured two or more contact points, including a portion of direct contact of the secondary battery 10 and the temperature sensor 22, and therefore the detection precision of temperature information can be significantly improved as compared with a state in which a secondary battery 110 and a temperature sensor 122 are in contact only at a point where foreign matter F is interposed there between, as illustrated in FIG. 9.

Thus, the battery module 1 according to the present embodiment allows securing sufficient contact points between the secondary battery 10 and the temperature sensor 22, and allows detecting temperature information about the secondary battery 10 with high precision; as a result, it becomes possible to control appropriately charging and discharging based on the temperature information.

2. Second Embodiment

A battery module according to the first embodiment of the present disclosure has been explained above. However, the battery module disclosed herein is not limited to the embodiment described above, and can include various modifications. A battery module according to a second embodiment will be explained next as an example of a battery module thus modified.

A battery module according to the second embodiment is identical to the battery module according to the first embodiment as regards the structure of a portion other than the contact region of the temperature sensor and the secondary battery. Therefore, the explanation below will focus mainly on the structure of the contact region of the temperature sensor and the secondary battery, and an explanation of the structure of other portions will be omitted.

Figure 5A:
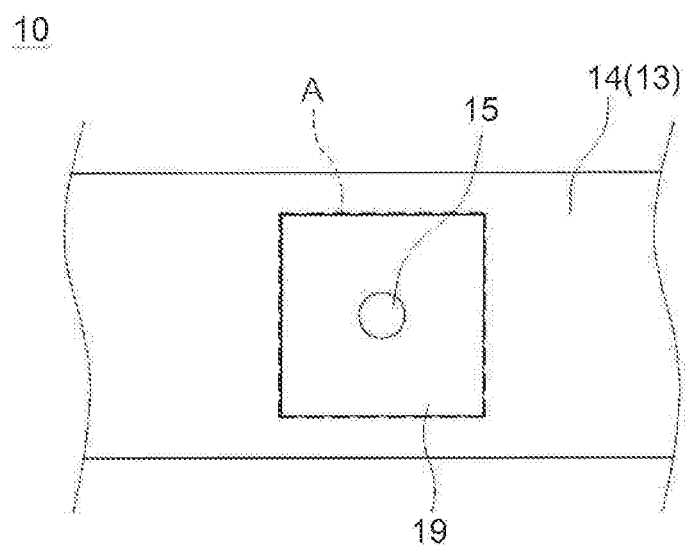
FIG. 5A is a plan-view diagram illustrating an enlargement of the vicinity of the contact region of a secondary battery used in a battery module according to a second embodiment of the present disclosure.
Figure 5B:
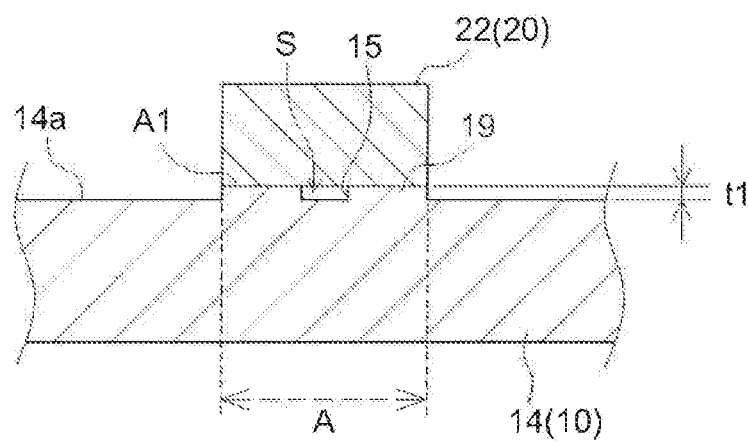
FIG. 5B is a diagram illustrating schematically the cross-sectional structure of the vicinity of a contact region of a secondary battery and a temperature sensor in a battery module according to a second embodiment of the present disclosure.

FIG. 5A is a plan-view diagram illustrating an enlargement of the vicinity of the contact region of a secondary battery used in a battery module according to the second embodiment. FIG. 5B is a diagram illustrating schematically the cross-sectional structure of the vicinity of the contact region of the secondary battery and the temperature sensor in the battery module according to the second embodiment.

In the battery module according to the second embodiment, as illustrated in FIG. 5A and FIG. 5B, a protrusion 19 having a shape (rectangular in a plan view) along the outer peripheral edge of the contact region A is formed on the top face 14a of the lid body 14 of the secondary battery 10. A recess 15 is formed at a central portion of the protrusion 19. To attach the temperature sensor 22 to the secondary battery 10, the temperature sensor 22 is disposed on the top face of the protrusion 19. A space S surrounded by the temperature sensor 22 and the protrusion 19 of the secondary battery 10 is formed thereby in the battery module according to the present embodiment. In this case, the space S can be formed such that foreign matter can be properly accommodated therein, similarly to the first embodiment described above. As a result, temperature information about the secondary battery 10 can be detected with high precision by suitably bringing the temperature sensor 22 and the secondary battery 10 into contact with each other.

Water droplets may become adhered to the top face 14a of the lid body 14 in a case where the environment in which the secondary battery 10 is placed is a high-humidity environment. A concern arises herein in that the detection precision of temperature information may decrease when water droplets intrude between the temperature sensor 22 and the secondary battery 10 along the top face 14a of the lid body 14. In a case where by contrast the protrusion 19 is formed in the lid body 14 and the temperature sensor 22 is disposed on the top face of the protrusion 19, as in the battery module 1 according to the present embodiment, a peripheral edge portion A1 of the contact region A is higher than the top face 14a of the lid body 14. As a result, it becomes possible to suppress intrusion of water droplets between the temperature sensor 22 and the secondary battery 10 along the top face (lid body 14) of the secondary battery 10, and to suppress more suitably decreases in the detection precision of temperature information.

The height t1 of the protrusion 19 is more 0.2 mm to 1.0 mm (for instance 0.3 mm). By prescribing the height t1 of the protrusion 19 to be 0.2 mm or greater it becomes possible to form a space S such that the foreign matter F can be accommodated therein properly, and to suitably prevent intrusion of water droplets between the temperature sensor 22 and the secondary battery 10. In some embodiments, the height t1 of the protrusion 19 is 1.0 mm or smaller, since the strength of the protrusion 19 decreases, and the protrusion 19 breaks readily, when the height t1 in the protrusion 19 is excessively large.

3. Third Embodiment

In the battery modules of the first and second embodiments described above, a recess 15 is formed such that the contact region A of the secondary battery and the temperature sensor is encompassed by the recess 15, and a space S is formed at the position of the recess 15. In the battery module disclosed herein however, the recess 15 need not necessarily be formed, and a space may be formed at the contact region by relying on some other structure.

Figure 6:
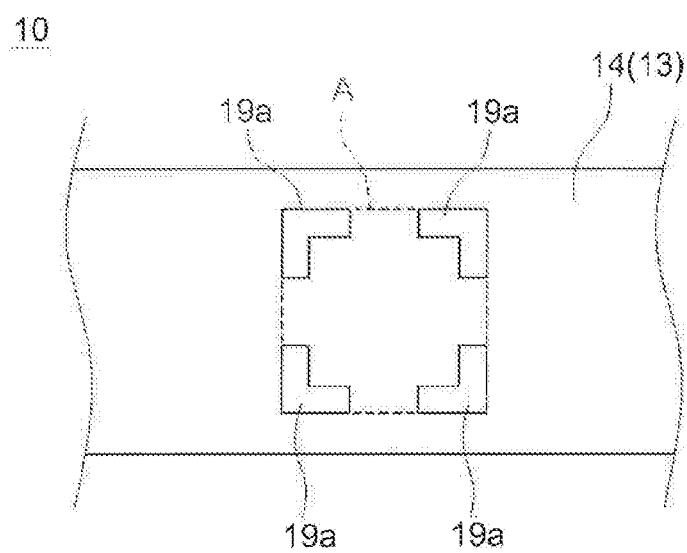
FIG. 6 is a plan-view diagram of an enlargement of the vicinity of a contact region of a secondary battery used in a third embodiment of the present disclosure.

Specifically, a space can be properly formed between the secondary battery and the temperature sensor also in a case where a plurality of protrusions is provided on the surface of the lid body, and the temperature sensor is disposed on the top face of the protrusion. FIG. 6 illustrates an example of an embodiment in which a space is formed by a plurality of protrusions.

In the battery module according to the third embodiment illustrated in FIG. 6 there are four flat L-shaped protrusions 19a formed on the lid body 14 of the secondary battery 10. The protrusions 19a are respectively disposed on the four corners of a square contact region A. A level difference such that the central portion of the contact region A is lower than the top faces of the protrusions 19a is formed as a result on the top face 14a of the lid body 14. A space S surrounded by four protrusions 19a can be formed when the temperature sensor 22 is disposed on the top faces of the protrusions 19a. Foreign matter generated for instance during laser welding can be suitably accommodated in the space S, as in the cases of first and second embodiments above. Therefore, drops in the detection precision of temperature information can be suppressed, in the battery module according to the present embodiment as well, through suitable contact between the temperature sensor 22 and the secondary battery 10.

4. Fourth Embodiment

In the battery module according to the first through third embodiments described above the space S is formed, in the contact region A of the secondary battery 10 and the temperature sensor 22, through formation of a level difference, for instance a recess or protrusion, in the lid body 14 of the secondary battery 10.

Figure 7:
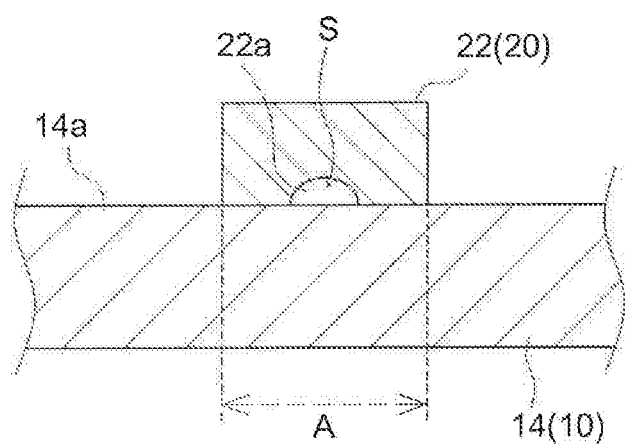
FIG. 7 is a diagram illustrating schematically the cross-sectional structure of the vicinity of a contact region of a secondary battery and a temperature sensor in a battery module according to a fourth embodiment of the present disclosure.

However, the level difference (recess, protrusion or the like) for forming a space between the secondary battery and the temperature sensor may be formed on the temperature sensor side. Also in a case where a level difference such as a recess 22a is formed on the temperature sensor 22 side, as in the fourth embodiment illustrated in FIG. 7, drops in detection precision of temperature information can be suppressed through formation of the space. S capable of accommodating foreign matter, in the contact region A of the secondary battery 10 and the temperature sensor 22.

In the first through fourth embodiments the level difference (recess, protrusion or the like) is formed in either the temperature sensor 22 or the secondary battery 10, but the level difference may be formed in both the temperature sensor and the secondary battery.

When a level difference such as a recess or protrusion is provided On the temperature sensor side, however, the strength of the temperature sensor or the detection precision of temperature information may be affected, and therefore the level difference is formed only on the secondary battery 10 side, as in the first through third embodiments.

5. Other Embodiments

Examples of embodiments of the battery module disclosed herein have been explained in the first through fourth embodiments above. However, the battery module disclosed herein is not limited to the above-described first through fourth embodiments, and various features of the battery module can be modified as needed. Examples of such variations are explained below.

(1) Number of Secondary Batteries

For instance the first through fourth embodiments described above cover a battery module in which the number of secondary batteries 10 is one. However, the number of secondary batteries in the battery module disclosed herein is not particularly limited, and can be increased or reduced as needed.

Figure 8:
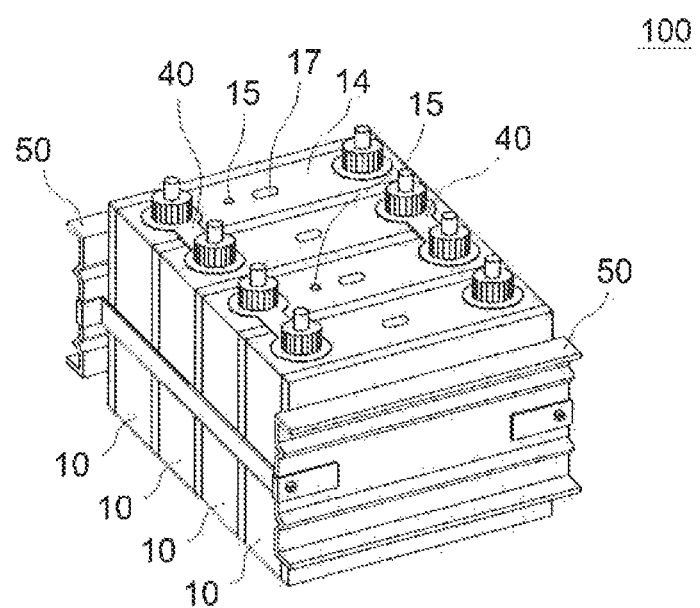
FIG. 8 is a perspective-view diagram of an assembled battery used in a battery module according to an embodiment of the present disclosure.

When using a plurality of secondary batteries, there is constructed an assembled battery 100 in which multiple secondary batteries 10 are connected by bus bars 40 and are restrained by a pair of restraint plates 50, as illustrated in FIG. 8. In a case where an assembled battery 100 is constructed, the temperature sensor may be attached to all the secondary batteries 10 that make up the assembled battery 100; alternatively, the temperature sensor may be attached to just specific secondary batteries 10. In FIG. 8, for instance, the recess 15 is formed in the lid body 14 of each even-numbered secondary battery 10, from the front of the page, in order to attach the temperature sensor to secondary batteries 10 disposed at even-numbered locations.

(2) Attachment Position of the Temperature Sensor

In all of the first through fourth embodiments described above, the temperature sensor 22 is attached to the lid body 14 that forms the top face of the battery case 13 of the secondary battery 10. However, the position at which the temperature sensor is attached is not particularly limited, and can be modified as appropriate, taking into consideration for instance space for mounting in a vehicle or the like. Therefore, the temperature sensor may be attached to the case body that forms the side faces or the bottom face of the battery case.

The temperature sensor need not be attached to the battery case. In a case where for example a secondary battery is used that has an exterior part (cover) with which the battery case is covered, the temperature sensor may be attached to the surface of the exterior part. In such an instance, an appropriate space can be formed, between the secondary battery and the temperature sensor, by providing in the exterior part a level difference (recess, protrusion or the like) such as those explained in the first through fourth embodiments described above.

(3) Recess Shape

In the first and, second embodiments described above, a recess having a circular shape in a plan view is formed, as illustrated in FIG. 3A and FIG. 5A. The shape of the recess in a plan view is however not particularly limited, and a recess having a square shape in a plan view can be formed. However, in some embodiments, a recess having a circular shape in a plan view is used in terms of ease processing, during formation of the recess.

In the case of a square recess, the length of the sides of the recess is set to lie in the range of 0.5 mm to 2 mm. As a result, it becomes possible to form, in the contact region, a space allowing foreign matter to be suitably accommodated therein, without incurring drops in detection precision derived from a decrease in the surface area of the contact region of the temperature sensor and the secondary battery.

A recess 15 having a curved bottom face is formed in the first embodiment described above, as illustrated in FIG. 4A. In some embodiments, however, the recess that is formed is a cylindrical recess having a flat bottom face. In a case where such a cylindrical recess is provided, sufficient depth can be secured over the entire are of the recess, and accordingly a space capable of accommodating foreign matter can be formed more suitably.

(4) Number of Recesses

In the first and second embodiments described above, only one recess 15 is formed at the contact region of the temperature sensor and the secondary battery. However, the battery module disclosed herein may have a plurality of recesses formed at the peripheral edge portion of the contact region, in addition to the recess in the central portion of the contact region. In such a case a plurality of spaces can be formed in the contact region of the temperature sensor and the secondary battery, and accordingly foreign matter can be prevented more suitably from becoming trapped between the temperature sensor and the secondary battery. On the other hand, an excessively large space between the temperature sensor and the secondary battery may give rise to a drop in detection precision, derived from a decrease in the surface area of the contact region. Accordingly, the number of recesses that are formed is to be adjusted properly, as needed.

TEST EXAMPLES

Test examples relating to the present disclosure will be explained next; however, the test examples below are not meant to limit the present disclosure in any way.

1. Test Examples (1) Test Example 1

In Test example 1, there was firstly produced a sheet-shaped positive electrode in which a positive electrode active material layer, resulting from mixing a positive electrode active material ($LiNi_{1/3}Co_{1/3}Mn_{1/3}O_2$), a conductive material (acetylene black), and a binder (polyvinylidene fluoride) at a proportion of 94:3:3 in mass ratio, was formed on both faces of a positive electrode collector (aluminum foil). Next, there was produced a sheet-shaped negative electrode in which a negative electrode active material layer, resulting from mixing a negative electrode active material (graphite), a thickener (carboxymethyl cellulose) and a binder (styrene-butadiene rubber), at a proportion of 98:1:1 in mass ratio, was formed on both faces of a negative electrode collector (copper foil).

The above-described positive electrode and negative electrode were laid up with a separator (polyethylene sheet) interposed in between, and thereafter the resulting stack was wound, to produce thereby a wound electrode body. The produced wound electrode body was accommodated in a battery case together with a nonaqueous electrolyte solution, to produce a lithium ion secondary battery. Four lithium ion secondary batteries produced in accordance with the above-described procedure were prepared, and the positive electrode terminals and negative electrode terminals of the respective batteries were connected using bus bars. Thereafter the batteries were restrained with restraints, to thereby produce an assembled battery.

In Test example 1, there was constructed next a battery module such that the state illustrated in FIG. 4B was reproduced. Specifically, a flat circular recess 15 having a diameter of 2 mm and a depth of 0.5 mm was formed in the lid body 14 of one of the batteries from among the four lithium ion secondary batteries, and foreign matter F (an aluminum piece) having a diameter of 0.3 mm was caused to adhere within the recess. Temperature detection unit 20 provided with a square-type temperature sensor 22 (10 mm×10 mm) having a built-in thermistor was prepared, and the temperature sensor 22 was attached to the lid body 14 in such a manner that a space S was formed through covering of the recess 15.

(2) Test Example 2

In Test example 2, there was constructed a battery module such that the state illustrated in FIG. 4C was reproduced. Specifically, there was prepared a secondary battery 10 in which a recess 15 was formed in the central portion of the contact region A, and foreign matter F was caused to adhere to the peripheral edge portion of the contact region A. The temperature sensor 22 was attached in such a manner that foreign matter F became trapped between the temperature sensor 22 and lid body 14. The contact sites of the temperature sensor 22 and the lid body 14 in that case were two points, i.e. the site of the interposed foreign matter F and a site of direct contact of the temperature sensor 22 and the lid body 14. The structure of the members that made up the battery module in Test example 2 was set to conditions identical to those of Test example 1.

(3) Test Example 3

In Test example 3, there was constructed a battery module such that the state illustrated in FIG. 9 was reproduced. Specifically, there was prepared a secondary battery 110 (lithium ion secondary battery) having no recess provided in the lid body, unlike in Test examples 1 and 2 described above, and foreign matter F was caused to adhere to the central portion of the contact region A. A temperature sensor 122 was attached in such a manner that foreign matter F became trapped between the secondary battery 110 and the temperature sensor 122, as illustrated in FIG. 9. The various structures in Test example 3 were set to obey conditions identical to those of Test example 1, except for the recess.

2. Evaluation Test

The test below was carried out as an evaluation test of the battery modules in the test examples.

Firstly, the assembled battery of each test example was charged at a charge and discharge rate of 40 A. The charged state was maintained for 30 minutes, and thereafter temperature information was calculated by the temperature detection unit on the basis of changes in the resistance value of the temperature sensor (thermistor) attached to the lid body. The temperature (actually measured value) of the assembled battery in each test example was measured using a thermometer, separately from the calculation by the temperature detection unit. A difference (temperature measurement error) between the temperature information calculated by the temperature detection unit and the actually measured value by the thermometer was then calculated. Table 1 illustrates the temperature measurement error of the test examples.

TABLE 1

|  | Shape of lid body | Adhesion site of foreign matter | Temperature measurement error (° C.) |
|---|---|---|---|
| Test example 1 | With recess | Central portion of contact region | ±1.2 |
| Test example 2 | With recess | Peripheral edge portion of contact region | ±2.1 |
| Test example 3 | Flat | Central portion of contact region | ±4.9 |

3. Evaluation Test

As Table 1 reveals, the error of the temperature information calculated by the temperature detection unit was very large, namely ±4.9° C., and the detection precision of temperature information was found to drop significantly, in Test example 3 where the state of FIG. 9 was reproduced. This can be ascribed to the fact that the contact portion of the temperature sensor 122 and the secondary battery 110 was only the point at which the foreign matter F was interposed, and that there was no direct contact between the temperature sensor 122 and the secondary battery 110.

In Test example 1, which reproduced the state of FIG. 4B, the temperature measurement error was by contrast ±1.2° C., and thus temperature information could be detected with high precision. From the above it follows that drops in detection precision of temperature information can be suppressed by forming the recess 15 in the lid body 14 of the secondary battery 10 and forming the space S capable of accommodating foreign matter F, in the central portion of the contact region A of the secondary battery 10 and the temperature sensor 22.

The temperature measurement error in Test example 2, where the state of FIG. 4C was reproduced, lay within an acceptable range. This is deemed to arise from the fact that in Test example 2, unlike the case of Test example 3, two or more contact points, including a site of direct contact, can be secured between the temperature sensor 22 and the secondary battery 10. From all the above it follows that drops in the detection precision of temperature information caused by foreign matter can be sufficiently suppressed by forming the space S in such a manner that at least the central portion of the contact region A is encompassed by the space S.

The present disclosure has been explained in detail above by way of concrete embodiments, but the above embodiments are merely illustrative in nature, and are not meant to limit the scope of the claims. The art set forth in the claims can include modifications and variations of the embodiments described above.

What is claimed is:

1. A battery module, comprising:
    at least one secondary battery;
    a temperature detection sensor that detects temperature information about the secondary battery, the temperature sensor comes into contact with the secondary battery; and
    a control device that controls charging and discharging of the secondary battery on the basis of the temperature information detected by the temperature detection sensor, wherein
    a level difference is provided at a surface of at least one of the secondary battery and the temperature sensor, in such a manner that a space is formed at least at a central portion of a contact region at which the secondary battery and the temperature sensor come into contact with each other,
    wherein the space is configured to receive foreign matter.

2. The battery module according to claim 1, wherein a recess is formed on the surface of at least one of the secondary battery and the temperature sensor, and the space is formed at a position of the recess at which the secondary battery and the temperature sensor are brought into contact with each other.

3. The battery module according to claim 2, wherein a surface area of the recess in a plan view is 1% to 5% of a surface area of the contact region.

4. The battery module according to claim 3, wherein the recess in the plan view has a circular shape, and the circular recess has a diameter of 0.5 mm to 2 mm.

5. The battery module according to claim 3, wherein the recess in the plan view has a square shape, and sides of the square recess each have a length of 0.5 mm to 2 mm.

6. The battery module according to claim 2, wherein the recess has a depth of 0.3 mm to 1.0 mm.

7. The battery module according to claim 1, wherein a protrusion is formed on the surface of at least one of the secondary battery and the temperature sensor, and a space surrounded by the protrusion is formed when the secondary battery and the temperature sensor are brought into contact with each other.

8. The battery module according to claim 7, wherein the protrusion has a height of 0.2 mm to 1.0 mm.

9. The battery module according to claim 1, wherein the control device is an electronic control unit.

10. A battery module, comprising:
at least one secondary battery;
a pair of electrode terminals;
a pair of connection members configured to contact the pair of electrode terminals;
a temperature detection sensor that detects temperature information about the secondary battery, the temperature sensor comes into contact with the secondary battery; and
a control device that controls charging and discharging of the secondary battery on the basis of the temperature information detected by the temperature detection sensor, wherein
a level difference is provided at a surface of at least one of the secondary battery and the temperature sensor, in such a manner that an empty space is formed at least at a central portion of a contact region at which the secondary battery and the temperature sensor come into contact with each other.

11. The battery module according to claim 10, wherein a recess is formed on the surface of at least one of the secondary battery and the temperature sensor, and the space is formed at a position of the recess at which the secondary battery and the temperature sensor are brought into contact with each other.

12. The battery module according to claim 11, wherein a surface area of the recess in a plan view is 1% to 5% of a surface area of the contact region.

13. The battery module according to claim 12, wherein the recess in the plan view has a circular shape, and the circular recess has a diameter of 0.5 mm to 2 mm.

14. The battery module according to claim 12, wherein the recess in the plan view has a square shape, and sides of the square recess each have a length of 0.5 mm to 2 mm.

15. The battery module according to claim 11, wherein the recess has a depth of 0.3 mm to 1.0 mm.

16. The battery module according to claim 10, wherein a protrusion is formed on the surface of at least one of the secondary battery and the temperature sensor, and a space surrounded by the protrusion is formed when the secondary battery and the temperature sensor are brought into contact with each other.

17. The battery module according to claim 16, wherein the protrusion has a height of 0.2 mm to 1.0 mm.

18. The battery module according to claim 10, wherein the control device is an electronic control unit.

19. A battery module, comprising:
at least one secondary battery;
a temperature detection sensor that detects temperature information about the secondary battery, the temperature sensor comes into contact with the secondary battery; and
a control device that controls charging and discharging of the secondary battery on the basis of the temperature information detected by the temperature detection sensor, wherein
a level difference is provided at a surface of at least one of the secondary battery and the temperature sensor, in such a manner that a space is formed at least at a central portion of a contact region at which the secondary battery and the temperature sensor come into contact with each other,
wherein a recess is formed on the surface of at least one of the secondary battery and the temperature sensor, and the space is formed at a position of the recess at which the secondary battery and the temperature sensor are brought into contact with each other, and
wherein a surface area of the recess in a plan view is 1% to 5% of a surface area of the contact region.

20. The battery module according to claim 19, wherein the recess in the plan view has a circular shape, and the circular recess has a diameter of 0.5 mm to 2 mm.

* * * * *

UNITED STATES PATENT AND TRADEMARK OFFICE
CERTIFICATE OF CORRECTION

Page 1 of 1

PATENT NO. : 10,847,980 B2
APPLICATION NO. : 16/209348
DATED : November 24, 2020
INVENTOR(S) : Mizuho Matsumoto It is certified that error appears in the above-identified patent and that said Letters Patent is hereby corrected as shown below:

In the Specification

Column 5, Line 29, delete "Will" and insert --will--, therefor.

Column 10, Line 48, after "space", delete ".".

In the Claims

Column 15, Line 28, Claim 10, before "space", delete "an empty" and insert --a--, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*